(12) United States Patent
Murphy et al.

(10) Patent No.: US 7,367,806 B1
(45) Date of Patent: May 6, 2008

(54) BRAILLE CELL CAP

(75) Inventors: Patrick Murphy, Riverview, FL (US); Todd Conard, Ruskin, FL (US); Waldemar H. Tunkis, Palm Harbor, FL (US); Michael Goldenberg, Melbourne Beach, FL (US); Carlos M. Rodriguez, Palm Harbor, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 241 days.

(21) Appl. No.: 10/711,427

(22) Filed: Sep. 17, 2004

Related U.S. Application Data

(60) Provisional application No. 60/481,979, filed on Jan. 30, 2004.

(51) Int. Cl.
*G09B 21/00* (2006.01)
(52) U.S. Cl. .................................................. 434/112
(58) Field of Classification Search ............... 434/112, 434/113, 115, 117; 400/109.1
See application file for complete search history.

(56) References Cited

U.S. PATENT DOCUMENTS

| | | | | |
|---|---|---|---|---|
| 4,836,784 A * | 6/1989 | Joachim | ..................... | 434/113 |
| 5,165,897 A * | 11/1992 | Johnson | ..................... | 434/113 |
| 5,226,817 A * | 7/1993 | Nakajima et al. | ........... | 434/113 |
| 5,449,292 A * | 9/1995 | Tani et al. | .................. | 434/114 |
| 5,685,720 A * | 11/1997 | Kashi | ........................ | 434/114 |
| 5,820,377 A * | 10/1998 | Murphy et al. | ............. | 434/113 |
| 5,842,867 A * | 12/1998 | Hong et al. | ................. | 434/114 |
| 6,109,922 A * | 8/2000 | Litschel et al. | ............. | 434/114 |
| 6,354,839 B1* | 3/2002 | Schmidt et al. | ............. | 434/113 |
| 6,700,553 B2* | 3/2004 | Becker et al. | ................ | 345/31 |
| 6,705,868 B1* | 3/2004 | Schleppenbach et al. | ... | 434/114 |
| 6,712,613 B2* | 3/2004 | Depta | ......................... | 434/114 |
| 6,743,021 B2* | 6/2004 | Prince et al. | ............... | 434/113 |
| 6,776,619 B1* | 8/2004 | Roberts et al. | ............. | 434/113 |
| 7,083,416 B1* | 8/2006 | Goldenbert | ................. | 434/113 |
| 2004/0091842 A1* | 5/2004 | Carro | ......................... | 434/112 |
| 2004/0175677 A1* | 9/2004 | Koch et al. | ................. | 434/113 |
| 2004/0197745 A1* | 10/2004 | Hong et al. | ................. | 434/113 |
| 2005/0158695 A1* | 7/2005 | Takahashi | .................... | 434/113 |

* cited by examiner

*Primary Examiner*—Kurt Fernstrom
(74) *Attorney, Agent, or Firm*—Holland & Knight LLP

(57) ABSTRACT

An electromechanical Braille cell assembly includes a plurality of parallel bimorph reeds. A first plurality of bimorph reeds is mounted to a first side of a printed circuit board by a first plurality of clips and a second plurality of bimorph reeds is mounted to a second side of the printed circuit board by a second plurality of clips. A frame has a top wall, a bottom wall, a first side wall in the form of an angle wall and a second side wall in the form of a flat wall. Pinholes are formed in the angle wall to accommodate Braille pins and the flat wall is slotted to accommodate a plurality of printed circuit boards. A monolithic cap covers all of the Braille pins. Pinholes formed in the cap receive the respective tips of the Braille cells when actuated bimorph reeds cause displacement of the Braille pins.

5 Claims, 15 Drawing Sheets

Prior Art

BRAILLE CELL CAP

CROSS REFERENCE TO RELATED DISCLOSURE

This application claims priority to Provisional Patent Application No. 60/481,979, filed Jan. 30, 2004 by the same inventors.

BACKGROUND OF THE INVENTION

1. Field of the Invention

This invention relates, generally, to Braille readers. More particularly, it relates to a Braille reader that captures information displayed on a computer screen and transforms the information into Braille.

2. Description of the Prior Art

Electronic devices that capture written information on a computer screen and transform the information into Braille are known. The known devices incorporate Braille cells that may include a plurality of hollow housings of parallelepiped construction, each of which houses either six (6) or eight (8) Braille pins. In the alternative, the housings may be solid and provided with bores for receiving the Braille pins. The pins are arranged in two (2) columns of three (3) or four (4) pins each.

When in repose, each pin is fully positioned within the hollow interior of its housing or its bore. One of the walls of the housing has six (6) or eight (8) openings formed therein through which the uppermost tips of the pins selectively extend when activated.

The pins are selectively extended by actuator means to represent Braille characters. For example, when the letter "A" is detected on a computer screen, an electrical signal is sent to an actuator and the combination of pins that represents that letter in Braille is activated so that the combination of pins representing that letter are actuated so that they physically extend outwardly of the housing so that they can be felt by a person reading Braille.

A bimorph reed, sometimes simply called a bimorph or a bimorph actuator, has a common center conductor sandwiched between two piezoceramic transducers. Series polled bimorph reeds are in common use in Braille cell actuators. Prior art Braille cell actuators incorporate series x-polled bimorph reed technology whereby the top and bottom elements are not electrically isolated from one another. The common center point is grounded and a high voltage is applied to one of the outer strips. A simple circuit drives the center conductor and fixes the outer conductor. This arrangement drives only one piezo element and the opposing element performs as a mechanical drag. Hence a bend is formed in the bimorph reed due to the difference in voltage-dependent expansion rates of the two parts of the bimorph reed, just as a bend is formed due to the difference in temperature-dependent expansion rates of the two parts of a bimetallic strip of the type commonly found in analog thermostats.

A special metallic plating is applied to the outer piezoceramic contacts to enable soldering of the leads to a printed circuit board (PCB). The need for such special metallic plating increases the manufacturing costs associated with each bimorph reed.

Accordingly, there is a need for an improved bimorph reed construction that does not require such special metallic plating.

Sixteen (16) hand-soldered wires requiring thirty-two (32) solder joints are necessary to establish the electrical connections.

Thus there is a need for an improved means for connecting the leads to the PCB. The improved means would reduce the number of solder joints required and thus lower the manufacturing costs while increasing the reliability of the Braille cell.

Prior art Braille cells employ one individual cap per individual Braille cell. This results in a reading surface that is rough because it includes grooves, gaps and steps between the individual caps. The individual tolerances of each Braille cell results in a gap between the Braille cells and their surrounding enclosure. Moreover, the assembly of each Braille cell cap drives up the cost of manufacturing.

More particularly, prior art Braille cells employ one individual tactile pin cap per individual Braille cell. The tactile pin cap serves to position and align the pins and further provides cursor control buttons. The Braille cells and associated tactile pin caps positioned adjacent to each other collectively form the tactile surface. The use of individual cell caps for each Braille cell increases the manufacturing cost as aforesaid as well as the cost of materials. Additional stabilizers are required to position and align the individual cell caps. Strict tolerances are required to provide an acceptable tactile feel for the reader. The reader is sensitive to the separation that is inherent between each cell with this design. This unevenness between each cell is a limitation of all Braille displays heretofore known. To tactile users, the tactility of the grooves and cell-to-cell unevenness is comparable to the noise or flicker on a computer monitor experienced by a sighted user. Additionally, maintenance and replacement of the individual tactile pins is often necessary. Contaminants that build up on the pins must be removed or the pins must be replaced upon excessive wear.

Accordingly, there is a need in the art for an improved electromechanical tactile cell for use in a refreshable Braille display. Improvements in manufacturability and reparability are necessary in addition to enhancements in the tactile experience of the user.

The time required to manufacture a plurality of caps, each of which must be within certain tolerance limits, and to individually cap each Braille cell drives up the cost of manufacturing. Prior art cell caps produce a gap between the Braille module and the opening in the Braille display case. Each gap is a result of the accumulation of dimensional tolerances on a per cell basis. The art teaches use of an extra frame to correctly space each cell at a centerline. This approach is unsatisfactory because it further accentuates the unevenness of the display and provides additional area for contaminates.

It would therefore be advantageous if a better way could be found to cover the Braille cells.

The mounting of bimorph reeds has also been a source of problems. Some Braille cell assemblies employ adhesives to adhere the bimorph reeds to a printed circuit board. Some use clamps which themselves must be adhered or otherwise attached to a suitable mounting surface.

Thus there is also a need for an improved means for mounting a bimorph reed to a Braille cell assembly.

However, in view of the prior art considered as a whole at the time the present invention was made, it was not obvious to those of ordinary skill in this field that the identified improvements should be made nor would it have been obvious as to how to make the improvements if the need for such improvements had been perceived.

SUMMARY OF THE INVENTION

The longstanding but heretofore unfulfilled need for an improved Braille cell and Braille cell cap assembly is now met by a new, useful, and non-obvious invention. The electromechanical Braille cell assembly of the present invention and the improved Braille cell cap of this invention provides manufacturing cost reductions and substantial improvements in utility and reliability over prior art Braille cell and Braille cell cap assemblies. The present invention also reduces the labor required to manufacture the Braille cell and Braille cell cap assemblies, thereby further reducing the cost of the device.

More particularly, the present invention obviates the need for thirty-two (32) hand-soldered joints and for the routing of sixteen (16) jumper wires, thereby facilitating the manufacturing process and improving the reliability of the product. Additional manufacturing improvements are realized through improved alignment between the Braille pins and the bimorph reeds, also known as bimorph strips or bimorph actuators or simply bimorphs.

The novel Braille cell assembly includes a universal mounting means forming a part of an Original Electronic Manufacturer (OEM) solution. The novel Braille assembly therefore defines a standard for interfacing with the assembly.

More particularly, the novel Braille cell assembly includes a plurality of parallel polled bimorph reeds. Each bimorph reed or strip includes a top plate, a bottom plate, and a center conductor strip sandwiched therebetween. A virtual bimorph ground is provided by grounding the center conductor, by electrically isolating the top and bottom plate from each other, and by applying a high voltage to both the top and bottom plates so that neither plate is a mechanical drag on the other as in prior art bimorph strips.

A novel clip mounts each bimorph reed to a printed circuit board. Each clip includes a horizontal top wall soldered to the printed circuit board and a horizontal bottom wall soldered to the PCB. A top arm formed integrally with the horizontal top wall has a linear contact area formed by a part that extends downwardly to the linear contact area and upwardly therefrom. A bottom arm formed integrally with the horizontal bottom wall has a linear contact area formed by a part that extends upwardly to the linear contact area and downwardly therefrom. The linear contact areas are spaced apart from one another by a distance that is slightly less than a thickness of a bimorph reed. A bimorph reed is slid between the two linear contact areas and is clampingly engaged by the inherent bias of the top and bottom arms.

Each clip, including its horizontal top and bottom walls and its top and bottom arms, is formed of an electrically conductive flexible and resilient material. The arms are inherently biased toward one another so that a bimorph when disposed in sandwiched relation therebetween is clampingly engaged thereby.

The clips are positioned about mid-length of their associated PCB. Each bimorph reed is engaged near its trailing end by its associated clip. The respective leading ends of the bimorph reeds extend beyond the leading ends of their associated PCBs.

The Braille cell assembly of this invention includes a plurality of Braille cells, each of which preferably includes eight (8) Braille pins in a housing. Each pin is actuated to extend out of the housing by a bimorph reed. Thus, there are eight (8) bimorph reeds for each Braille cell. A first set of four (4) bimorphs are clippingly engaged to a first side of a printed circuit board to actuate a first column of four (4) Braille pins and a second set of four (4) bimorphs are clippingly engaged to a second side of the printed circuit board to actuate a second column of four (4) Braille pins.

In a preferred embodiment, twenty (20) printed circuit boards are mounted in a hollow frame structure, more particularly known as a chassis or backplane. As above-mentioned, each printed circuit board provides a mount for eight (8) bimorph reeds. Accordingly, each PCB drives one (1) Braille cell. In a preferred embodiment, known as a double decade, there are two (2) sets of ten (10) Braille cells mounted on the novel frame structure. Thus, there are twenty (20) PCBs and one hundred sixty (160) bimorph reeds mounted in the chassis/backplane. In a preferred embodiment, such collection of twenty (20) PCBs is considered a module. Each module is interconnectable with another module. Thus, a user may purchase one (1) module or any multiple thereof when purchasing a Braille display case. Advantageously, repairs are easily made by exchanging a good module for a broken or malfunctioning module so that a user need not purchase an entire Braille display case when a problem arises.

The chassis/backplane has a top wall, a bottom wall, a first, leading sidewall in the form of an angle wall and a second, trailing sidewall in the form of a flat wall. A horizontal section of the angle wall is disposed in abutting and coplanar relation to a leading edge of the frame top wall and the vertical section of the angle wall is disposed in abutting relation to the leading end of the frame bottom wall. The longitudinal extent of the frame top wall is thus less than the longitudinal extent of the frame bottom wall, the difference in longitudinal extents being equal to the longitudinal extent of the horizontal section of the angle wall.

The flat wall is disposed in abutting relation to the trailing edge of the top wall and the trailing edge of the bottom wall.

A plurality of sockets is mounted on the top wall of the frame, in depending relation thereto, with each socket having a trailing end disposed near a trailing edge of the top wall. Each socket is adapted to receive an upper, trailing longitudinal edge of an upstanding PCB.

A plurality of slots is also formed in the top wall to receive the respective leading ends of the PCBs.

Each PCB has a protuberance formed in its lowermost, trailing end. A corresponding plurality of slots is formed in the bottom edge of the flat wall of the frame to respectively receive the protuberances to thereby enhance the mounting of the PCBs within the frame.

A first plurality of clips is soldered to a first side of each printed circuit board and a second plurality of clips is soldered to on a second side of each printed circuit board as aforesaid. Each clip holds a bimorph reed in substantially parallel relation to the top and bottom walls of the frame and each center conductor of each bimorph reed is soldered to its associated PCB.

A plurality of sets of pinholes is formed in the horizontal section of the angle wall and each pinhole is adapted to slideably receive a Braille pin.

A first set of bimorph reeds clipped to a first side of a first PCB includes four (4) bimorph reeds having a common length. The bimorph reeds are staggered with respect to one another so that a leading end of a first, uppermost bimorph reed extends a first distance beyond a leading end of its PCB, a leading end of a second bimorph reed mounted below the first bimorph reed extends beyond the leading end of the first bimorph reed, a leading end of a third bimorph reed mounted below the second bimorph reed extends beyond the leading end of the second bimorph reed, and a leading end of a fourth bimorph reed mounted below the third bimorph reed extends beyond the leading end of the third bimorph reed.

A second set of bimorph reeds clipped to a second side of a first PCB also includes four (4) bimorph reeds having a common length. The bimorph reeds are staggered with respect to one another so that a leading end of a first, uppermost bimorph reed extends a first distance beyond a leading end of its PCB, a leading end of a second bimorph reed mounted below the first bimorph reed extends beyond the leading end of the first bimorph reed, a leading end of a third bimorph reed mounted below the second bimorph reed extends beyond the leading end of the second bimorph reed, and a leading end of a fourth bimorph reed mounted below the third bimorph reed extends beyond the leading end of the third bimorph reed.

Each bimorph reed is clipped to the printed circuit board so that a leading end of each bimorph reed is positioned beneath a Braille pin disposed in the pinholes formed in the horizontal section of the angle wall. The respective leading ends of the four (4) bimorph reeds on the first side of the PCB abut or are closely spaced apart from the lowermost ends of the pins in a first column of four (4) Braille pins in a Braille cell and the respective leading ends of the four (4) bimorph reeds on the second side of the PCB abut or are closely spaced apart from the lowermost ends of the pins in a second column of four (4) Braille pins in a Braille cell.

The Braille pins may be formed independently of one another or they may be formed in connected relation to one another so that one set of connected Braille pins is adapted to fit within one Braille cell. In the latter, eight Braille pins are releasably connected to one another so that individual pins of the set of connected Braille pins are detachable from one another after being placed into respective pinholes of a Braille cell.

Each pin of the plurality of Braille pins has a four (4) part construction. More particularly, each pin has a first, lowermost part of solid or hollow construction that may have a transverse cross-section of any predetermined geometrical configuration. A second part also has a solid or hollow construction that may have a transverse cross-section of any predetermined geometrical configuration but its breadth is greater than that of the first section. Accordingly, a first shoulder is formed where the first and second parts meet one another. A third part of the pin is of solid or hollow construction and may also have a transverse cross-section of any predetermined geometrical configuration. The breadth of the third part is less than the breadth of the second part, forming a second shoulder where said second and third parts meet. In a preferred embodiment, the third part has a non-circular cross-section such as a star-shaped cross-section, but any non-circular cross-section such as triangular, square, pentagonal, hexagonal, elliptical, oblong, crescent, and the like is within the scope of this invention.

The fourth part of each pin has a solid or hollow construction and may have a transverse cross-section of any predetermined geometric configuration. It has a breadth less than the breadth of the third part, thereby forming a third shoulder where said third and fourth parts meet. The fourth part includes a rounded free end adapted for tactile communication with a user of the inventive structure. The user feels the tip when the pin is extended, i.e., displaced from its position of repose by an actuated bimorph reed.

The tip of the first pin in the first column of pins is extended when voltage is applied to the uppermost bimorph reed in the first set of bimorph reeds. The tip of the second pin in the first column of pins is extended when a voltage is applied to the bimorph reed mounted immediately below the first bimorph reed. The tip of the third pin in the first column of pins is extended when a voltage is applied to the bimorph reed mounted immediately below the second bimorph reed and the tip of the fourth pin in the first column of pins is extended when a voltage is applied to the bimorph reed mounted immediately below the third bimorph reed.

The tip of the first pin in the second column of pins is extended when voltage is applied to the uppermost bimorph reed in the second set of bimorph reeds. The tip of the second pin in the second column of pins is extended when a voltage is applied to the bimorph reed mounted immediately below the first bimorph reed. The tip of the third pin in the second column of pins is extended when a voltage is applied to the bimorph reed mounted immediately below the second bimorph reed and the tip of the fourth pin in the second column of pins is extended when a voltage is applied to the bimorph reed mounted immediately below the third bimorph reed.

A monolithic cell cap covers each Braille cell of the plurality of Braille cells. It also covers a plurality of buttons that are dedicated to control of a cursor. More particularly, a first plurality of cursor-control buttons is mounted in upstanding relation to the top wall of the chassis/backplane. A first comb-like holder holds the first plurality of buttons. Each button of the first plurality of buttons has a head and a stem, the head being enlarged with respect to its stem. The first comb-like holder includes parallel, contiguous teeth that are spaced apart from one another. The free end of each tooth is adapted to engage the heads of its associated button.

A second plurality of buttons is also mounted in upstanding relation to the top wall of the chassis/backplane. A second comb-like holder holds the second plurality of buttons. Each button of the second plurality of buttons has a head and a stem, the head being enlarged with respect to its stem. The second comb-like holder includes parallel, contiguous teeth that are spaced apart from one another. The free end of each tooth is adapted to engage the heads of its associated button. The first comb-like holder and the second comb-like holder are disposed in confronting relation to one another.

Each comb-like holder includes twenty (20) teeth. There being two (2) comb-like holders, there is a total of forty (40) buttons, i.e., two (2) buttons for each of the twenty (20) Braille cells in a module.

The bottom wall of the novel chassis/backplane is formed of a material that does not require additional isolation from the metal chassis to which it is mounted.

The monolithic cap that covers the first and second comb-like holders is releasably engaged to the top wall of the chassis/backplane. The monolithic cap has a first set of forty (40) openings formed therein to receive the respective heads of the buttons and a second set of one hundred sixty openings formed therein to receive the respective tips of eight (8) Braille pins of twenty (20) Braille cells when said tips are extended by actuation of their associated bimorph reeds.

The number of buttons and Braille cells may be changed to meet the requirements of various applications. The number of buttons and Braille cells of this illustrative embodiment is merely a preferred number.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
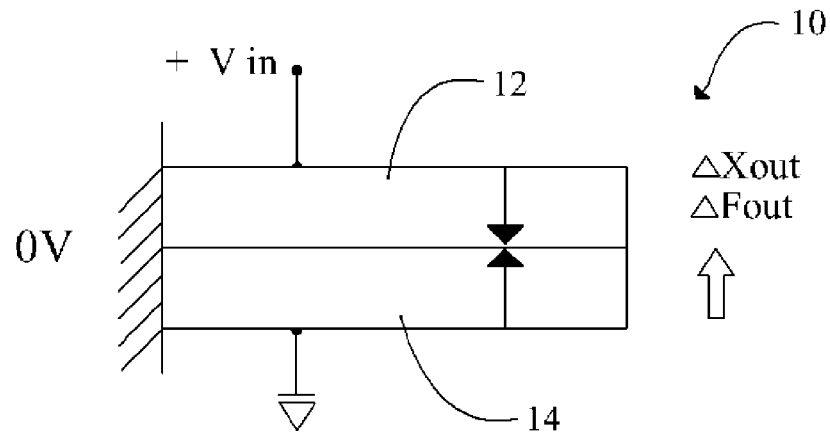
FIG. 1A is a diagrammatic view of a prior art series bimorph reed.
Figure 1B:
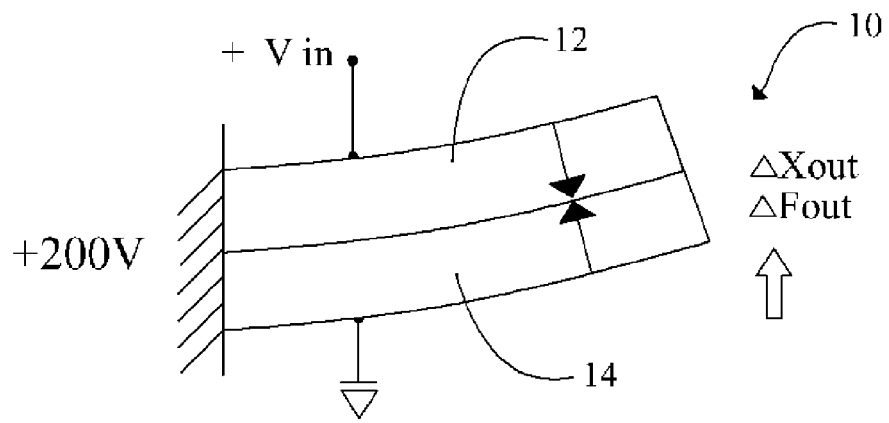
FIG. 1B is a diagrammatic view of a prior art series bimorph reed.

Referring briefly to FIGS. 1A and 1B, it will there be seen that prior art series x-polled bimorph 10 is excited on only one side of the element. In FIG. 1A, the reference numeral 10 denotes the bimorph when no voltage is applied thereto. A bimorph is made of two strips of conductors that expand longitudinally at different expansion rates when voltage is applied thereto. Accordingly, conductors 12 and 14 share a common length when no voltage is applied thereto as depicted in FIG. 1A.

In FIG. 1B, 200 volts is applied to prior art bimorph 10. In this particular example, the expansion rate of conductor 14 exceeds that of conductor 12 so that the length of conductor 14 exceeds that of conductor 12 when voltage is applied to conductor 12. Bimorph 10 therefore becomes curved. The amount of curvature increases in direct relation to an increase in applied voltage. No voltage is applied to the central electrode in a series-polled bimorph.

Figure 2A:
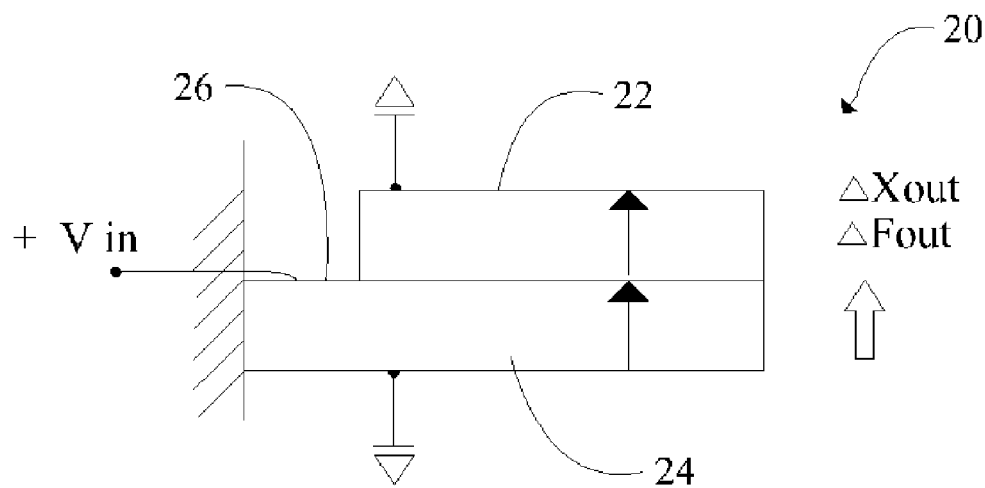
FIG. 2A is an illustration of the operation of a parallel bimorph reed in accordance with the present invention.
Figure 2B:
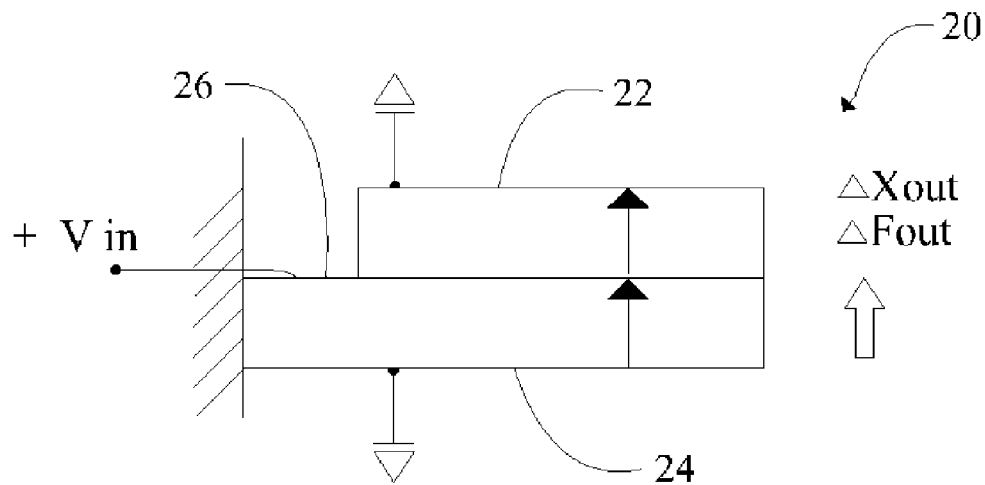
FIG. 2B is an illustration of the operation of a parallel bimorph reed in accordance with the present invention.

Turning now to FIGS. 2A and 2B, there it will be seen that this invention discloses the use of parallel polled bimorphs 20 in Braille cell assemblies as distinguished from the prior art series polled bimorphs. The novel parallel polled bimorph design harnesses the power of bimorph technology by driving both sides of the piezo bender with a common voltage of the same polarity, as depicted diagrammatically in FIGS. 2A and 2B, and by grounding the central conductor. Novel bimorph 20 includes top plate 22, bottom plate 24, and internal or central conductor 26. Any applied voltage in the range from zero (0) to two hundred fifty (250) volts is within the scope of this invention.

A novel virtual bimorph ground, established by grounding the center conductor, eliminates the prior art need for custom drive electronics to drive both positive and negative high voltage rails. Moreover, the novel parallel polled bimorphs enable the provision of common electrical contact between top and bottom plates 22 and 24, respectively. Said top and bottom plates 22, 24 are electrically isolated from one another.

As depicted in FIGS. 2A and 2B, the top and bottom elements 22, 24 of y-polled bimorph 20 are polarized in a common direction. This configuration enables busing the outer conductors and driving internal strip 26. With this method, both top and bottom piezo elements 22, 24 are properly biased so that they work together. A novel "virtual ground" is created at 100V to enable the existing drive electronics to operate this superior piezo technology. Other voltages for the establishment of the virtual ground are within the scope of the invention.

Figure 3:
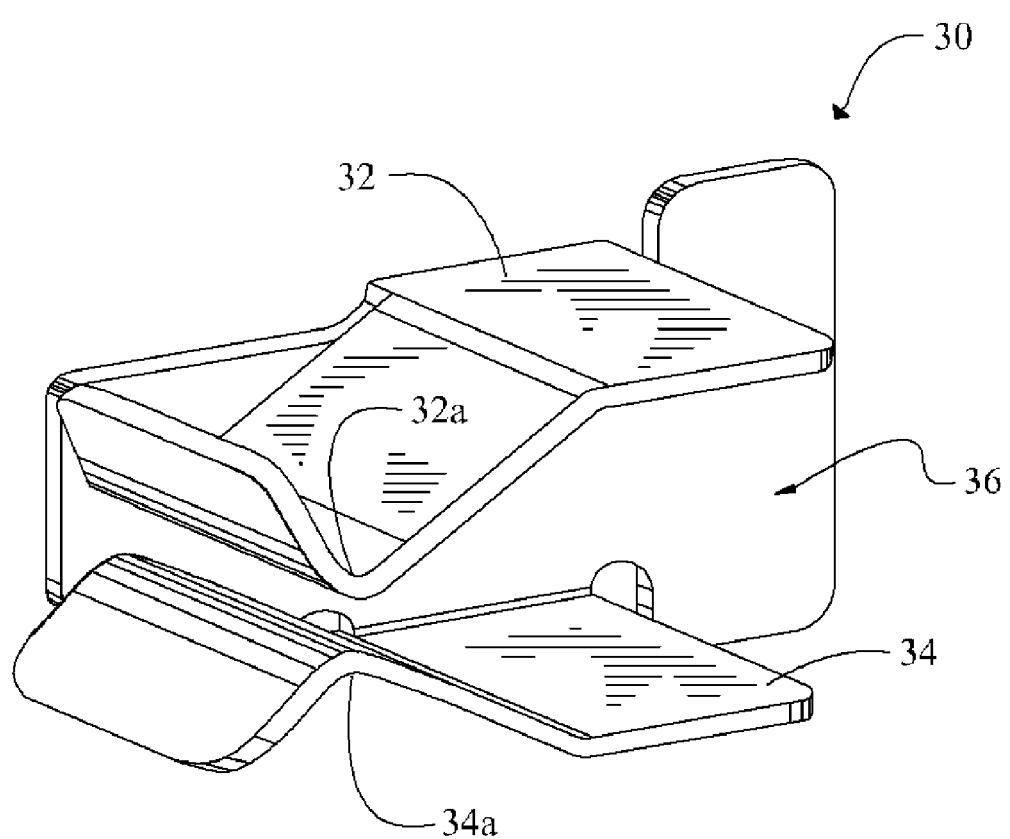
FIG. 3 is a perspective view of the novel bimorph reed clip of this invention.

The use of parallel bimorphs enables busing of piezo strips 22 and 24. A simplified clip providing mechanical stability and electrical contact may therefore be used, without requiring special metallic plating. More particularly, the top and bottom plates are electrically isolated from one another by novel bimorph clip denoted 30 as a whole in FIG. 3. Clip 30 includes top horizontal wall 32 and bottom horizontal wall 34. Top horizontal wall 32 is soldered to PCB 36 and has an arm that extends downwardly to linear contact area 32a and upwardly therefrom. Conversely, bottom horizontal wall 34 is also soldered to PCB 36 and has an arm that extends upwardly to linear contact area 34a and downwardly therefrom. The space between contact area 32a and 34a is slightly less than the thickness of bimorph reed 20. Each arm is formed of an electrically conductive flexible and resilient material and said arms are inherently biased toward one another so that a bimorph reed 20 disposed in sandwiched relation therebetween is firmly engaged thereby. Bimorph clip 30, being integrally formed with PCB 36, secures bimorph reed 20 to said PCB.

The invention is not limited to the depicted design of clip 30. A wide variety of other bimorph reed clip designs providing mechanical stability and electrical contact is within the scope of the invention. Bimorph reed clip 30 is designed for the surface mount technology (SMT) process to avoid manual placement of the part. The bimorph reed clip also is mechanically ideal for piezo alignment and vibration.

The use of parallel polled bimorph reeds in combination with bimorph clip 30 eliminates the prior art need for sixteen (16) wires and thirty-two (32) hand-solder joints per Braille cell assembly. The parallel polled bimorph reed design also results in an estimated fifty percent (50%) power reduction by reducing the operating voltage and the mechanical resistance presented by the prior art construction.

Note that each bimorph actuator is mechanically held at its fulcrum by metal contacts on the PCB. These contacts also provide an electrical connection for biasing the bimorph actuator. This novel structure is an improvement over the above-mentioned prior art structures that hold the bimorph in a mechanical frame formed of non-conductive plastic and which require the soldering of sixteen (16) wires and thirty-two (32) hand-soldered connections per cell. The new cell eliminates all wires and thus all of the thirty two (32)

hand-soldered connections. Only the center conductor is soldered by hand in the novel design. This solder connection is completed in the constraints of alignment fixture to accurately control the position of the work end of the bimorph.

Bimorph clip 30 may be thought of as a split clip or an isolated clip because the contact on the top of the bimorph is electrically isolated from the contact on the bottom of the bimorph. In another embodiment of clip 30, known as a common clip, not deemed currently suitable for use in a commercial embodiment of the invention, the top of the bimorph is mechanically and electrically connected to the bottom of the bimorph. Although functional, the effects of long-term aging of the ceramic in the bimorph are unacceptable. In this common clip, both halves of the bimorph work in concert with one another but untested piezo material properties, specifically the aging effect of reverse-biasing the ceramic material, require further investigation. Half the high voltage, or 100 volts, was applied to the center of the common clip. This center voltage, or bimorph virtual ground, enables the use of standard high voltage drive circuitry and a common clip. The common clip may become viable as advances are made in piezo-ceramic technology.

The serviceability of each novel bimorph is maintained and improved over other designs. If an individual Braille dot does not meet specification, that Braille cell is removed and the bad bimorph removed by reflowing a single solder joint. The replacement bimorph is then inserted into the Braille cell PCB and aligned with the aid of a fixture. This avoids the problem in removing prior art bimorphs where individual bimorph removal is complicated by the attachment of two (2) wires to each bimorph.

Figure 4A:
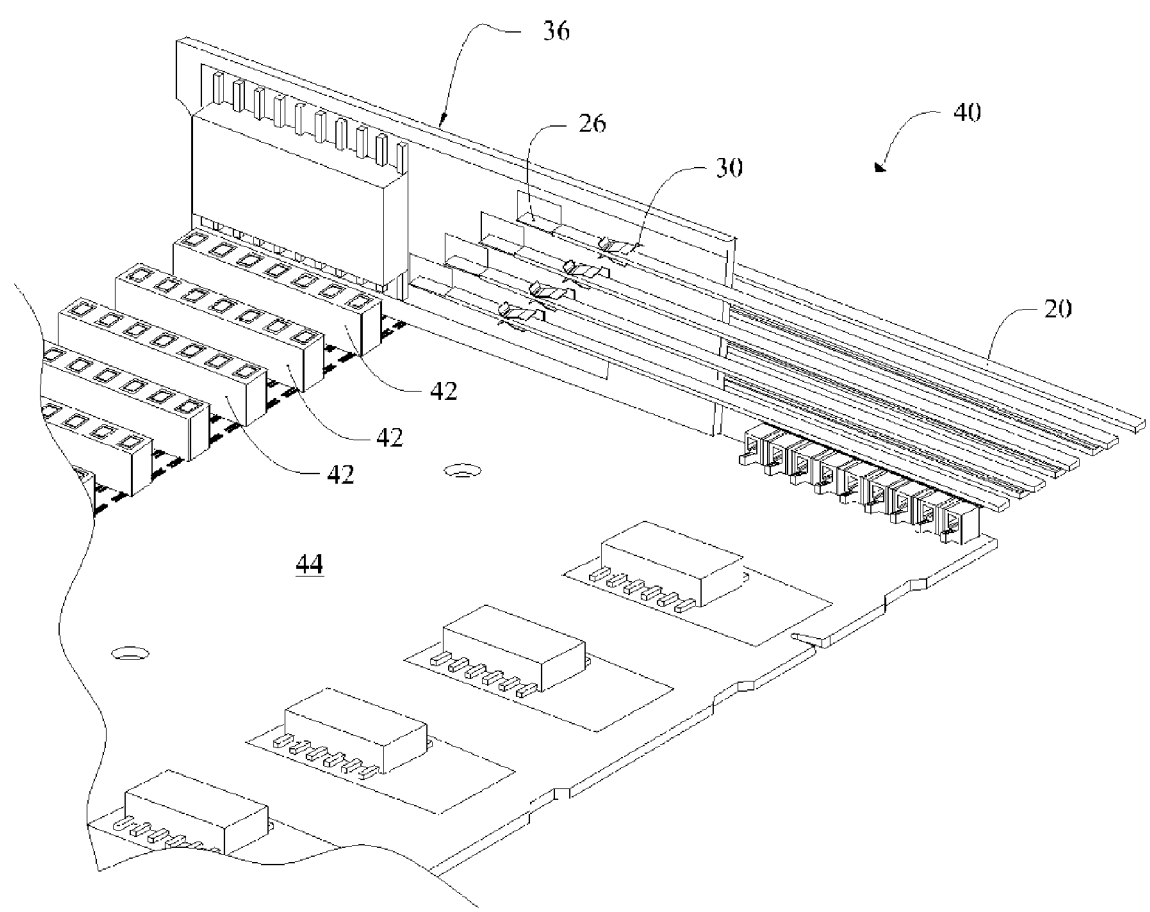
FIG. 4A is a perspective view depicting the interconnection between a Braille cell assembly and a frame.
Figure 4B:
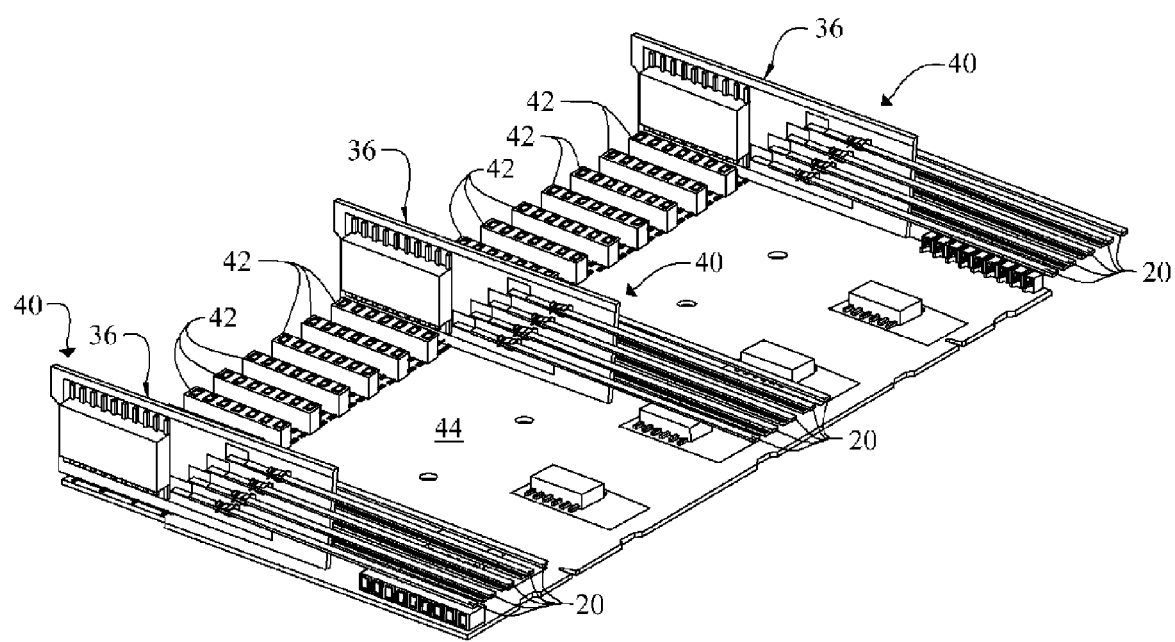
FIG. 4B is a perspective like that of FIG. 4A, but depicting three (3) Braille cell assemblies secured to the frame.

FIG. 4A depicts a Braille cell assembly 40 mounted on top wall 44 of a chassis/backplane not depicted in this figure and FIG. 4B depicts a plurality of said Braille cell assemblies mounted on said top wall. Braille cell assembly 40 includes PCB 36 to which is soldered a plurality of novel bimorph clips 30 in vertically spaced relation to one another during standard SMT processing. A bimorph reed 20 is then inserted between biased arms 32, 34 of each clip 30 using an alignment jig. Each center conductor 26 of each bimorph reed 20 is then soldered to PCB 36. This process eliminates the need for sixteen (16) hand-soldered jumper wires. It also eliminates the prior art need for providing plating on bimorph reed 20 to enable said bimorph reed to accept solder.

A plurality of PCB-receiving sockets 42 is mounted on top wall 44 in spaced relation to one another as depicted. A large number of Braille cell assemblies 40 may therefore be mounted to said top wall as suggested by FIG. 4B.

Figure 5:
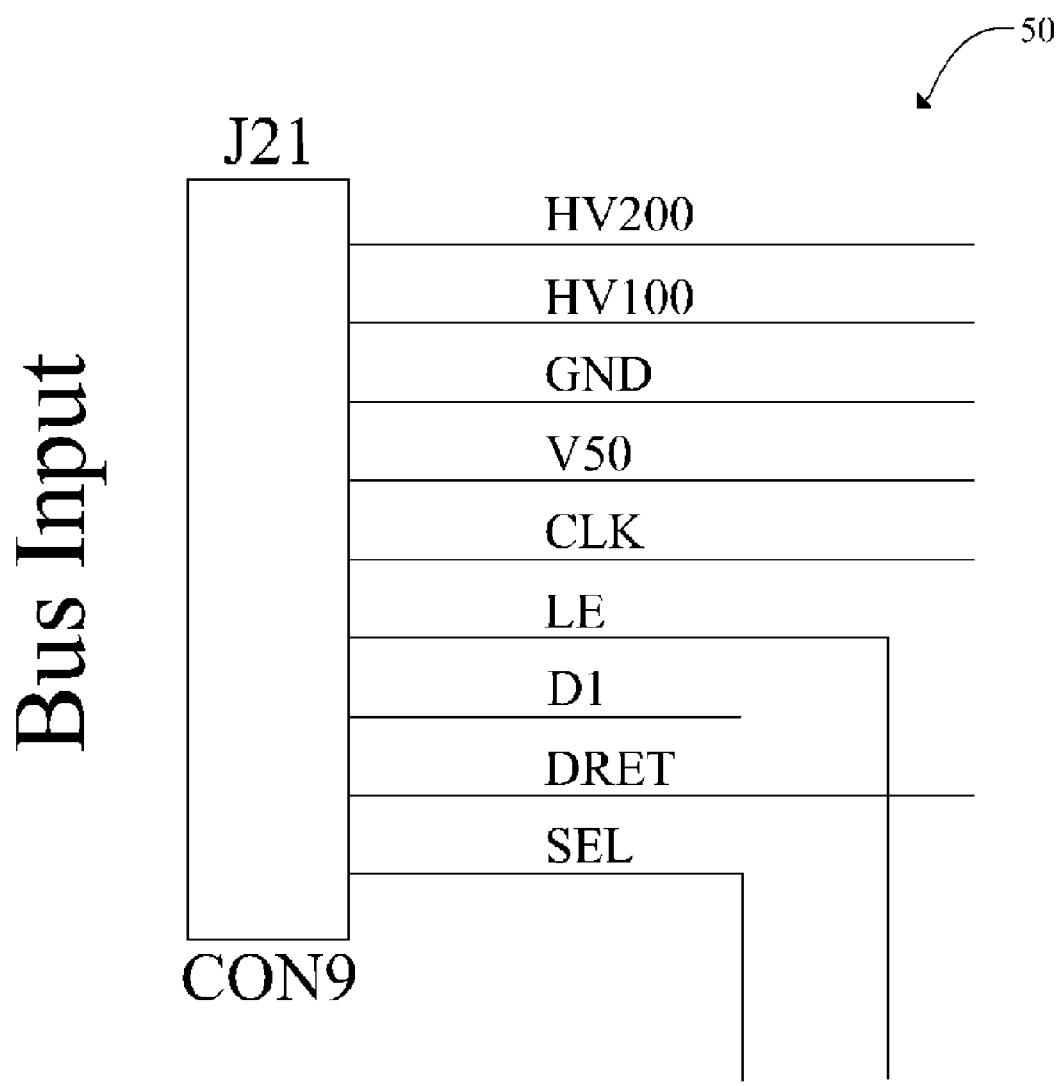
FIG. 5 depicts an exemplary interface that forms a part of the present invention.

FIG. 5 discloses the pin connections of Braille device interface 50. Interface 50 defines the required connections to drive the display. This embodiment enables left or right side connections and further enables independent scanning of key switches without changing latched display data.

Figure 6A:
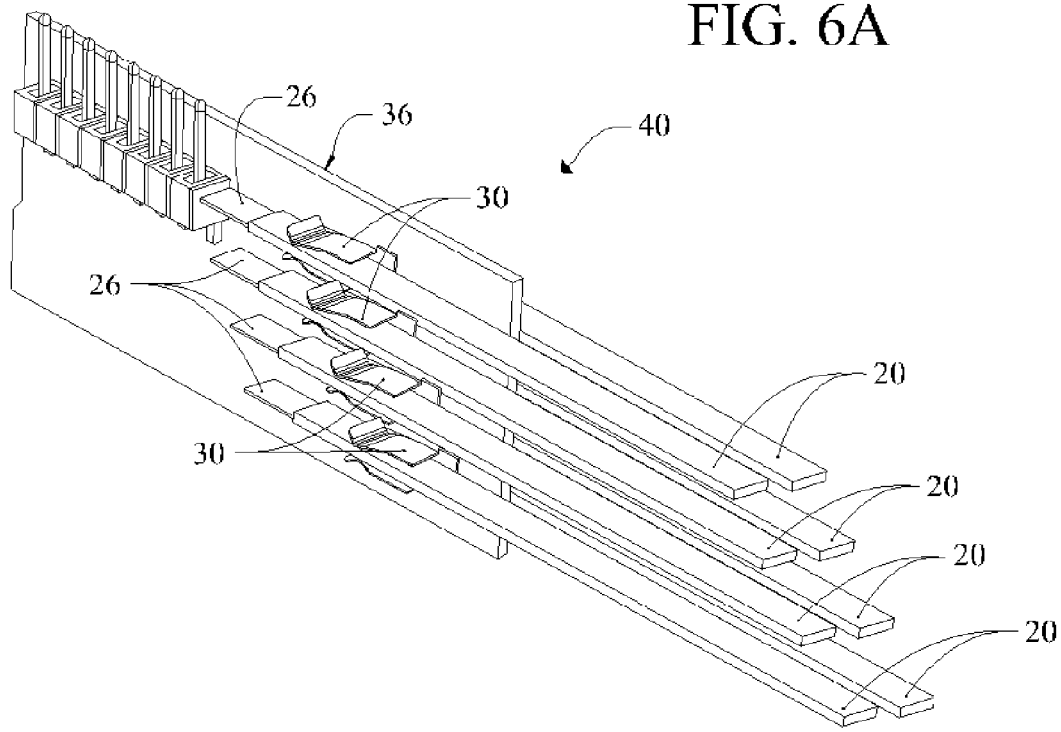
FIG. 6A is a perspective view of a first side of the novel Braille cell assembly.
Figure 6B:
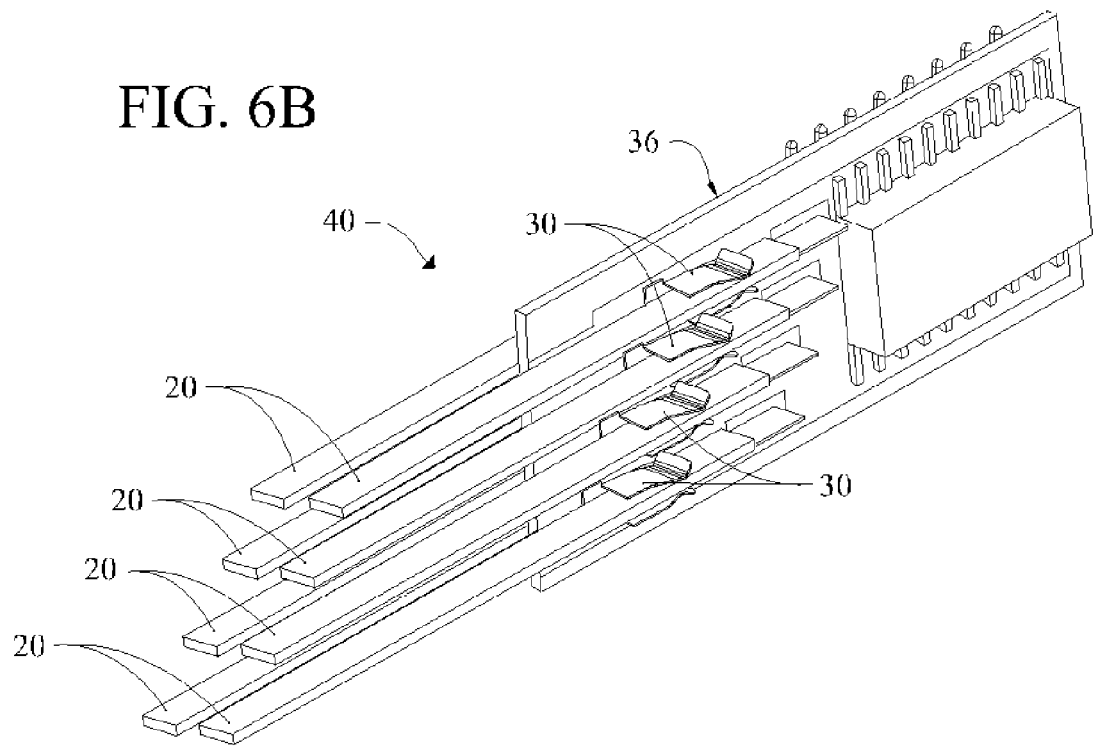
FIG. 6B is a perspective view of a second side of the novel Braille cell assembly.

FIGS. 6A and 6B are perspective views of opposite sides of Braille cell assembly 40. The disclosure of these FIGS. 6A and 6B is essentially the same as the disclosure of FIGS. 4A and 4B but FIGS. 6A and 6B make it clearer that clips 30 and bimorph reeds 20 are mounted on both sides of PCB 36. Note that there are four (4) bimorph reeds 20 mounted on each side of PCB 36 so that there are eight (8) bimorph reeds mounted on each PCB 36. Accordingly, it should be understood that each PCB is dedicated to a Braille cell having eight (8) Braille pins and each bimorph reed is dedicated to a Braille pin of said Braille cell.

Figure 7A:
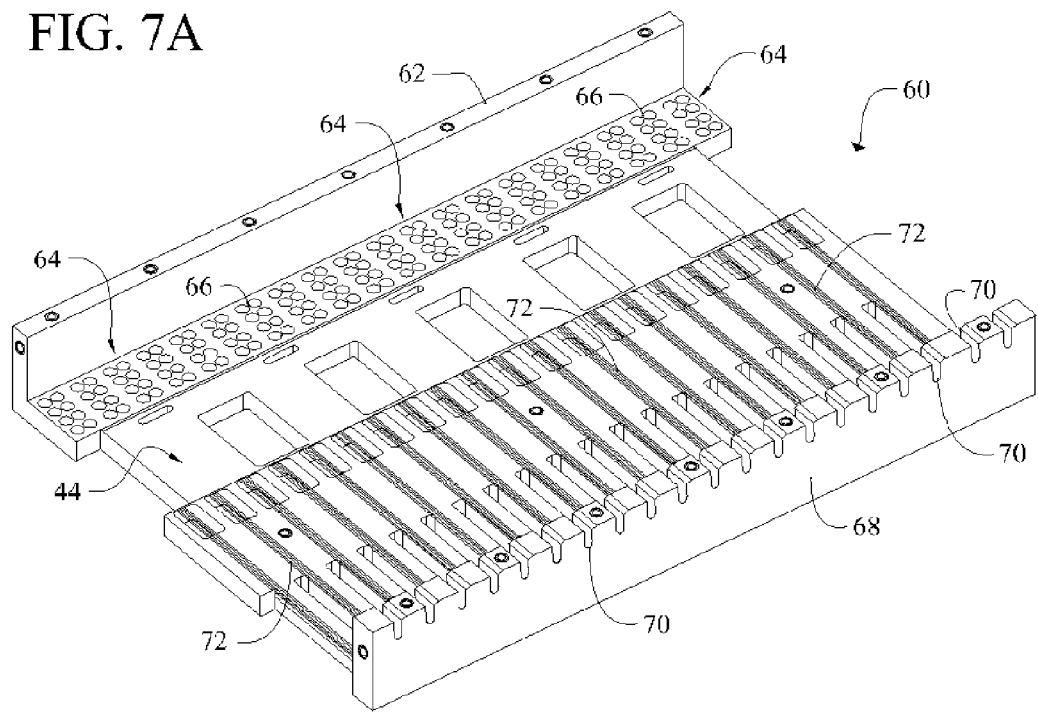
FIG. 7A is a top perspective view of the chassis/backplane of the novel Braille cell assembly.
Figure 7B:
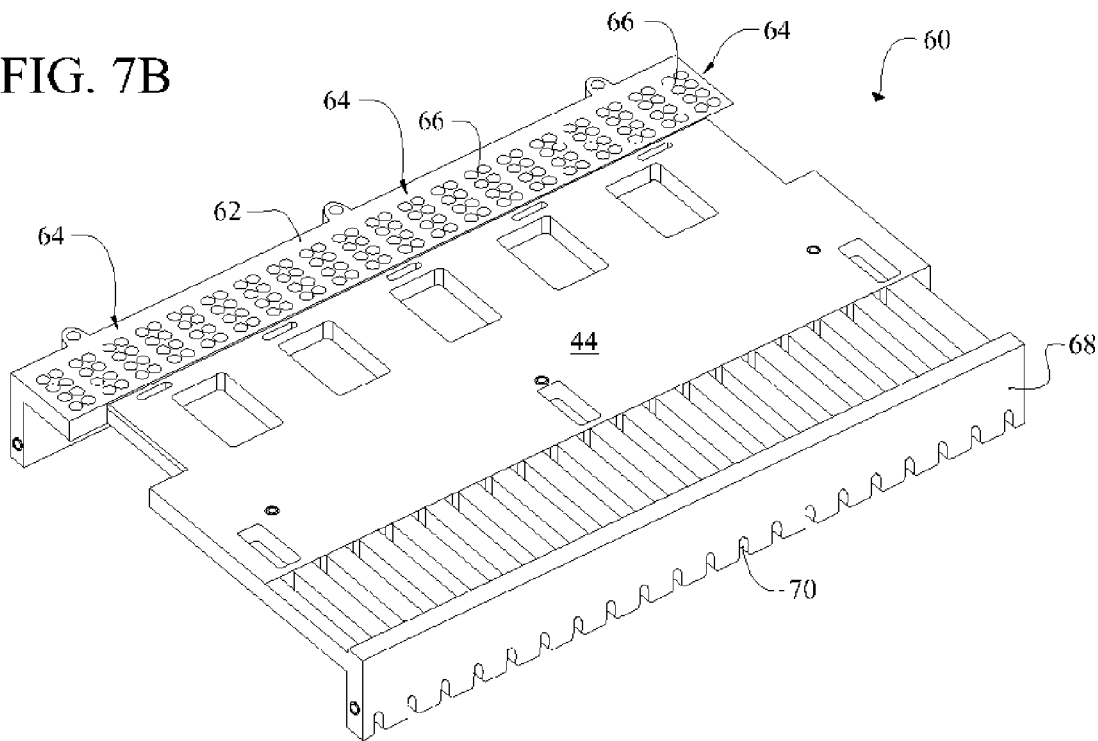
FIG. 7B is a bottom perspective view of the chassis/backplane of the novel Braille cell assembly.

FIG. 7A is a top perspective view of chassis/backplane 60 and FIG. 7B is a bottom perspective view thereof. Chassis/backplane 60 includes top wall 44 (see FIGS. 4A and 4B) and bottom wall 46. It also includes an angle wall 62 having a plurality of sets 64 of pinholes or bores 66 formed in a horizontal part 62a thereof. Horizontal part 62a of angle wall 62 abuts a leading edge of top wall 44 and is coplanar therewith. Each pinhole or bore 66 is adapted to slideably receive a pin, not depicted in FIGS. 7A and 7B. Note that there are eight (8) pinholes or bores 66 per set 64 of pinholes or bores.

Upstanding flat wall 68 abuts a trailing edge of top wall 44 and a trailing edge of bottom wall 46. A plurality of slots 70 is formed in the lower edge of said flat wall 68. Each slot engages a protuberance 36a formed in the trailing end of its associated PCB. A corresponding plurality of slots 72 is formed in top wall 44 to accommodate the respective leading ends of the PCBs. Each set of slots 70 and 72 cooperate with one another to provide a mount for each PCB 36.

Figure 8A:
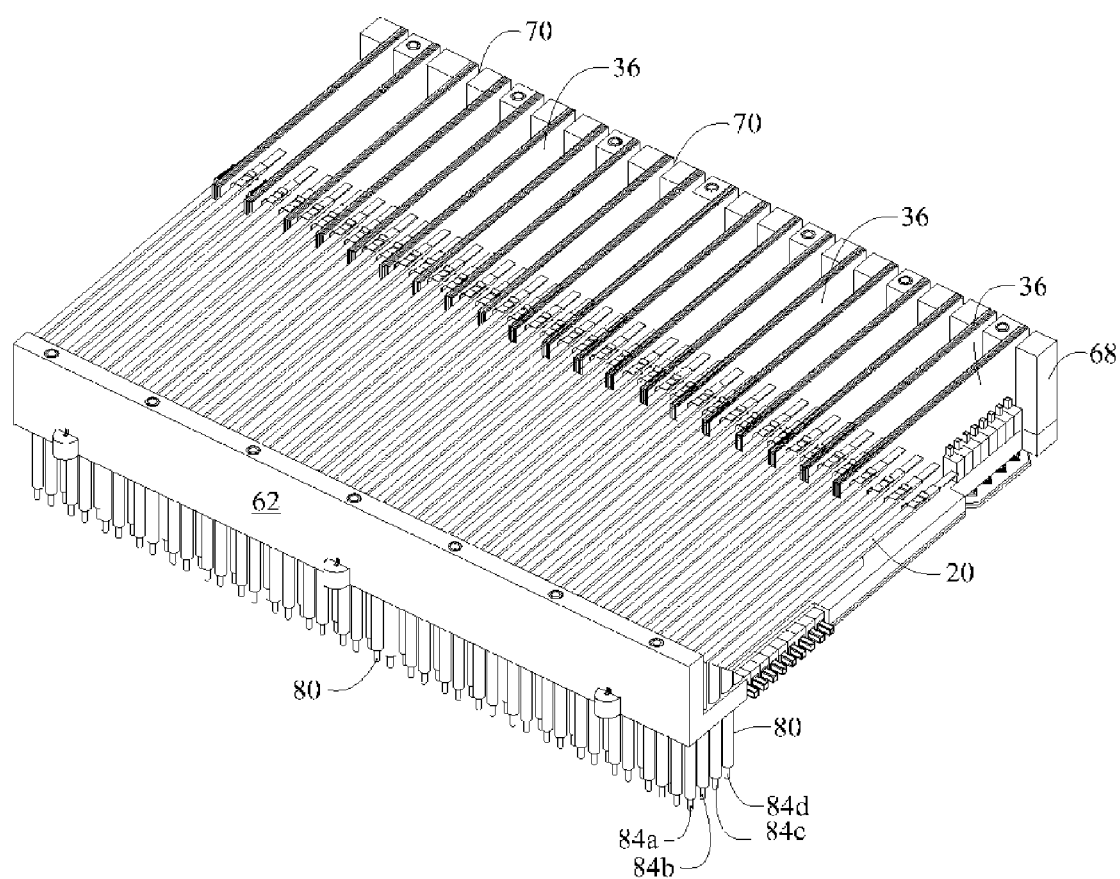
FIG. 8A is a perspective view depicting the interconnection between the Braille cell PCB and the top wall of the chassis/backplane.

FIG. 8A depicts chassis/backplane 60 when a PCB 36 is mounted in each slot 70 and 72. It also depicts a Braille pin 80 disposed in each pinhole or bore 66. One (1) bimorph reed 20 is associated with each pin 80, there being one PCB 36 having eight (8) bimorph reeds mounted thereto associated with each set 64 of eight (8) pinholes or bores 66 as aforesaid.

Figure 8B:
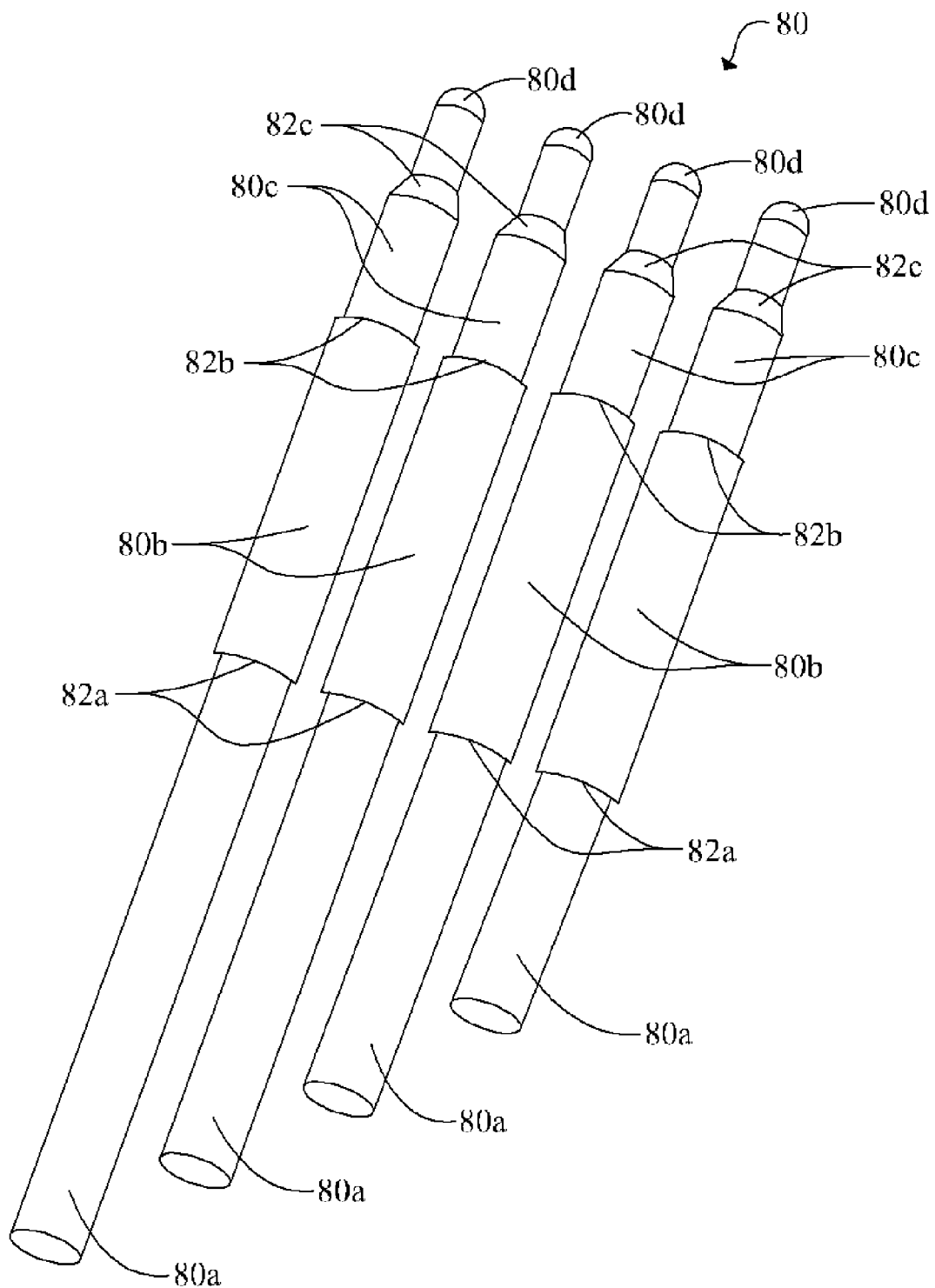
FIG. 8B is a perspective view of a set of novel Braille pins.

Pins 80 are provided in four differing lengths as indicated in FIG. 8B. The pins may be manufactured individually, or they may be manufactured in connected-together groups of eight (8) that are separated from one another after assembly into the Braille cell, thereby improving manufacturability.

Each pin 80 has a solid or hollow construction and includes four (4) parts that share a common longitudinal axis of symmetry. Each of the four (4) parts may have a transverse cross-section of any predetermined geometrical configuration. A more detailed description of the pins is provided in U.S. patent application Ser. No. 10/710,808, filed Aug. 4, 2004 by the same inventors. That patent application is hereby incorporated by reference into this disclosure.

Figure 9A:
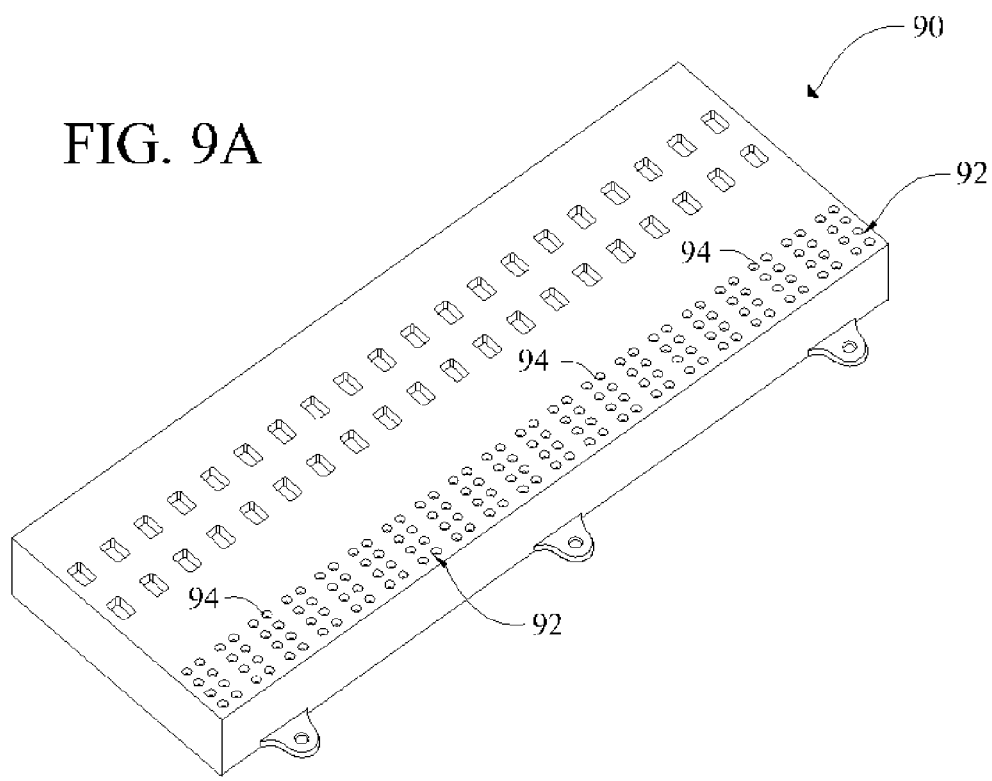
FIG. 9A is a top perspective view of the novel cell cap.
Figure 9B:
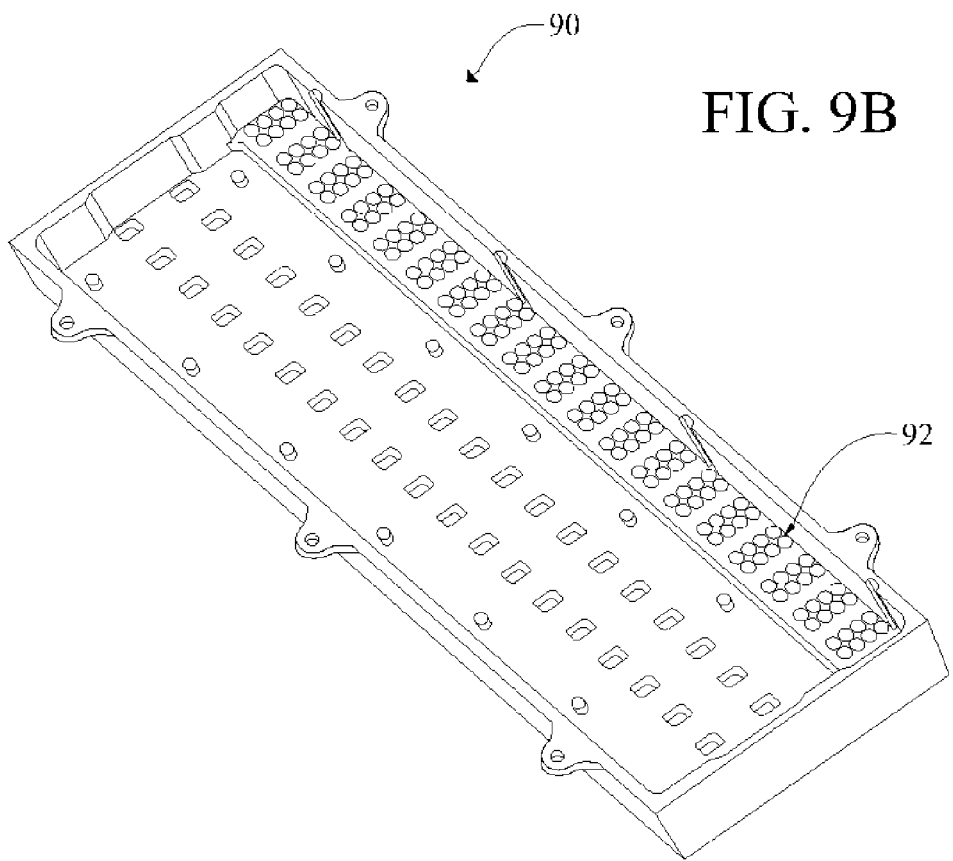
FIG. 9B is a bottom perspective view of the novel cell cap.

The novel cell cap of this invention is depicted in FIGS. 9A and 9B and is denoted as a whole by the reference numeral 90. Twenty (20) sets 92 of pinholes 94 are depicted, each pinhole being adapted to slidingly receive tip 80d of pin 80. This configuration is referred to as a "double decade" and represents one (1) module. Unlike the aforementioned prior art Braille cells that require one individual cap per set of pinholes, cell cap 90 is a monolithic cap for all sets of pinholes, i.e., cell cap 90 enables one cap to cap a plurality of Braille cells. Cell cap 90 significantly reduces the tolerance issues associated with individual caps without compromising access to the individual Braille cells if repair or replacement is required.

Cell cap 90 of the Braille multi-cell module is smooth, lacking the grooves and unevenness between each cell (character) found in all existing Braille displays on the market. This advantageous side-effect of a cost-reduction effort is one of the most significant features of the invention. To users, the tactility of the grooves and cell-to-cell unevenness of prior art Braille displays is equivalent to the aggravation caused sighted people by the noise and flickering of a computer monitor. The paper-like smoothness of the novel Braille display is a first in the electronically refreshable Braille display industry.

Moreover, the monolithic cell cap provides better dimensional control of the Braille electromechanical module when it is assembled in the final product. Prior art cell caps produce a gap between the Braille module and the opening in the Braille display case. Each gap is a result of the accumulation of dimensional tolerances on a per cell basis as distinguished from the novel single dimensional tolerance for a plurality of cells. The invention of the monolithic cell cap supplants the above-mentioned prior art approach that employs an extra frame to correctly space each cell at a centerline. This prior art approach is unsatisfactory because it further accentuates the unevenness of the display and provides additional area for contaminates.

Monolithic cell cap 90 can be constructed with antibacterial plastics or other suitable materials to inhibit the spread and growth of germs.

In all embodiments, the Braille pin of the assembly is captive in the mechanical design. It is secured between a top wall of the chassis/backplane 60 and cell cap 90, providing a negative and a positive stop to the Braille pin's displacement, respectively. There is no dependency on the bimorph actuators to hold the Braille pins in place. This improves manufacturability and serviceability. This low cost part of the design (frame top wall, cell cap, and pins) eliminates the requirement to clean bio-contaminates on a regular basis, as it can now be considered a disposable item. The Braille cell PCB that contains the expensive high voltage control circuitry, expensive bimorph actuators, and critical alignment is reused in a new, clean mechanical chassis/backplane during cleaning or refurbishment of the display.

Figure 10:
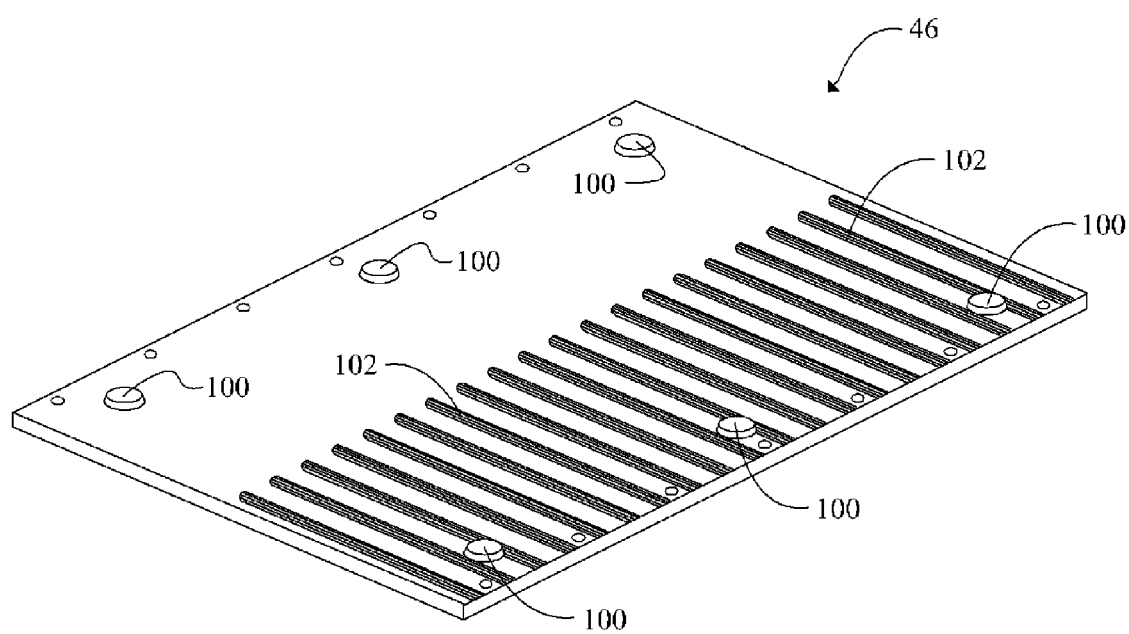
FIG. 10 is a perspective view of the chassis/backplane bottom wall.

Frame (chassis/backplane) bottom wall 46 is more fully depicted in FIG. 10. Six (6) threaded inserts, collectively denoted 100, are employed to attach the double decade assembly to the final OEM product. Frame bottom wall 46 is preferably constructed of a material that does not require additional isolation from the metal chassis to which it is mounted. Slots 102 cooperate with slots 72 formed in frame top wall 44 to hold PCBs 36.

Figure 11:
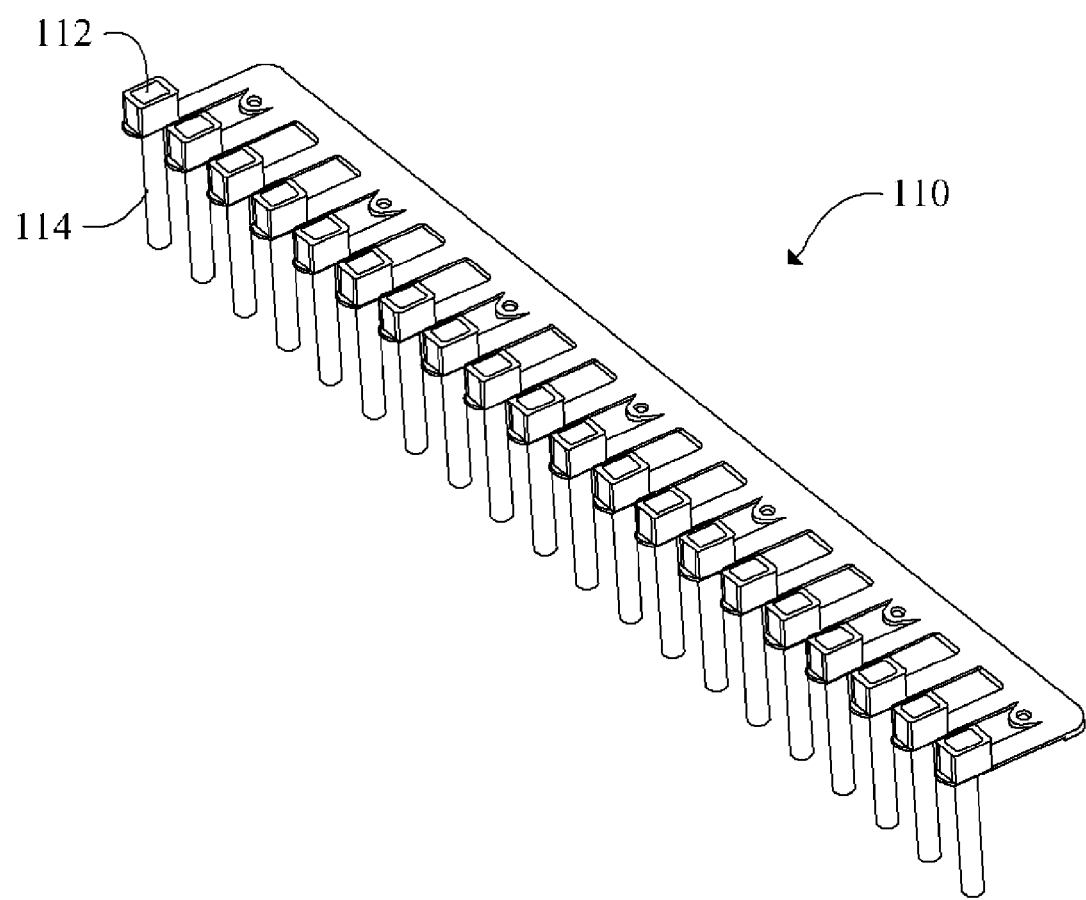
FIG. 11 is a perspective view of a novel set of buttons.

FIG. 11 illustrates a set of buttons and a frame 110 for holding the buttons. Each button has a head 112 that is enlarged with respect to its stem 114. Frame 110 has a comb-like construction where the contiguous teeth of the comb are spaced apart from one another by a space that slideably receives a stem 114. The teeth of the comb thus support heads 112. Buttons 110 perform functions relating to cursor location and panning features.

Figure 12:
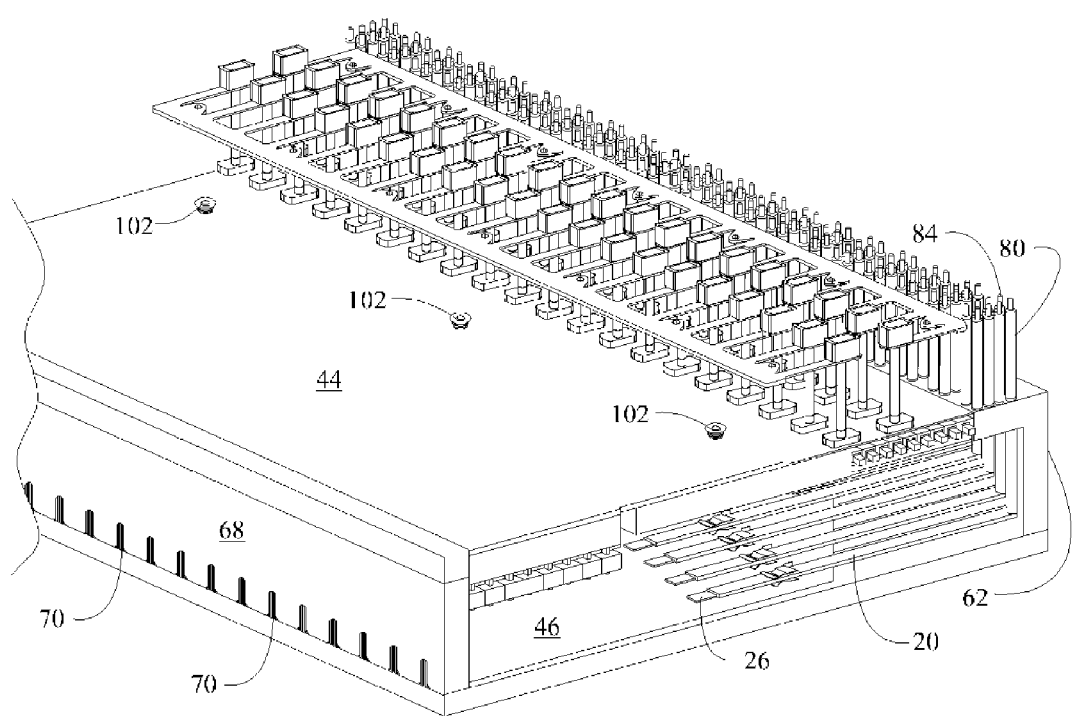
FIG. 12 is a perspective view of the novel double decade Braille cell assembly without the cell cap.

FIG. 12 depicts the novel double decade Braille cell assembly without the novel cell cap. Note that there are two (2) button and frame assemblies 110 of the type depicted in FIG. 11 and that said assemblies 110 are disposed in confronting relation to one another.

Figure 13:
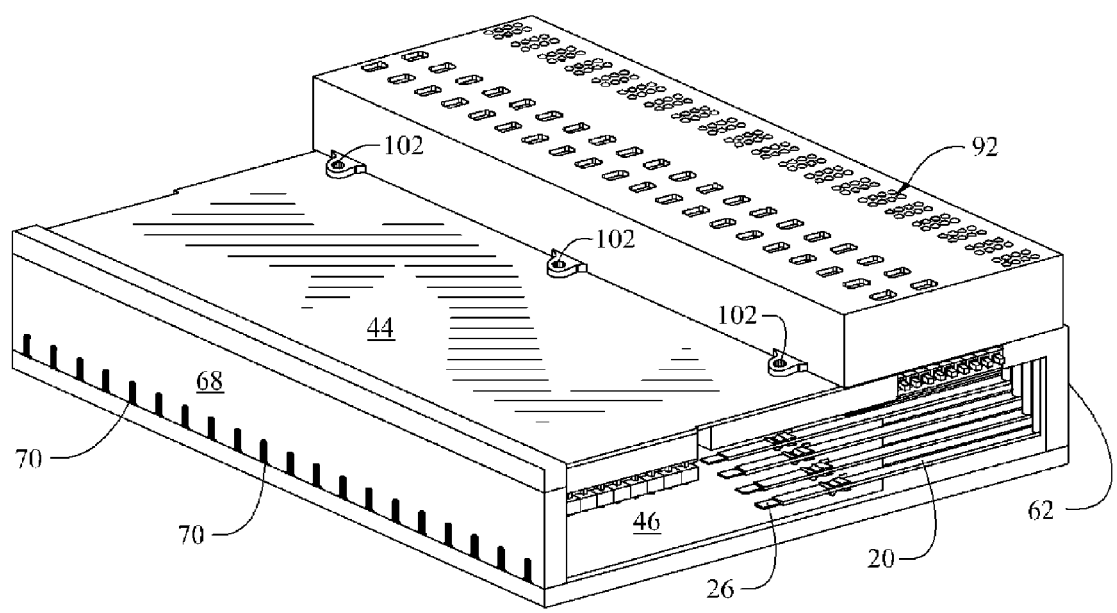
FIG. 13 is a perspective view of the novel double decade Braille cell assembly with the cell cap.

FIG. 13 depicts the double decade Braille cell assembly with the novel cell cap 92 in its functional position. All pins are in their retracted position in this Fig.

The modularization provided by the novel design is a key to success in providing a low cost product that is economical to manufacture and easy to service. Each of the Braille cells can be individually installed or removed from service as a result of the backplane/chassis solution. The backplane/chassis provides the benefits of electrical interconnect, correct mechanical alignment, high voltage isolation, and a stable platform for additional circuitry such as tactile switches commonly used for routing the cursor to a specified cell location.

Any number of cells may be used in the modularization, and each module is interconnectable to another module. For commercial purposes, the minimum-sized module has been selected at twenty (20) cells, thereby enabling the selling of products including twenty (20) cells, forty (40) cells, sixty (60) cells, eighty (80) cells, and so on. Other module sizes are within the scope of this invention. For example, production of a four (4) cell module would enable production of a forty four (44) cell Braille display (20+20+4), a seventy-two cell Braille display (20+20+20+4+4+4), an eighty four (84) cell Braille display (20+20+20+20+4), and so on.

The provision of the monolithic cell cap also produces an array of button caps over the tact switches. This array of button caps reduces labor costs. Prior art Braille cell manufacturers require each switch cap be individually installed.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween. Now that the invention has been described,

What is claimed is:

1. A Braille cell assembly, comprising:
   a monolithic Braille cell cap that encases a plurality of Braille cells;
   said monolithic cap enhancing the tactile feel of a Braille cell assembly by eliminating the uneven surface provided by a plurality of individual Braille cell caps, said monolithic Braille cell cap comprising a top plate and a plurality of side walls such that the side walls are approximately perpendicularly connected to the top plate;
   a first plurality of buttons;
   a first comb-like holder for holding the first plurality of buttons;
   each button of said first plurality of buttons having a head and a stem, said head being enlarged with respect to its stem;
   said first comb-like holder including contiguous teeth that are spaced apart from one another;
   and each button being mounted to a free end of each tooth.

2. The Braille cell assembly of claim 1, further comprising:
   a second plurality of buttons;
   a second comb-like holder for holding the second plurality of buttons;
   each button of said second plurality of buttons having a head and a stem, said head being enlarged with respect to its stem;
   said second comb-like holder including contiguous teeth that are spaced apart from one another;
   and each button being mounted to a free end of each tooth.

3. The Braille cell assembly of claim 2, further comprising:
   said first and second comb-like holders being mounted to a top wall of a Braille cell assembly frame in confronting relation to one another.

4. The Braille cell assembly of claim 3, further comprising:
   said monolithic cap covering said first and second comb-like holders;
   said monolithic cap being releasably engaged to said top wall of said frame.

5. The Braille cell assembly of claim 1, further comprising:
  at least one protuberance approximately perpendicularly connected to at least one side wall, such that the at least one protuberance is approximately parallel to the top plate of the monolithic cell cap, the at least one protuberance further comprising a means for connecting the monolithic cell cap to a top wall of a Braille cell assembly frame.

* * * * *